April 21, 1925.

H. H. VERNON 1,534,750

MOTOR CONTROL SYSTEM

Filed May 5, 1924

2 Sheets-Sheet 1

Inventor:
Harvey H. Vernon,
by
His Attorney.

April 21, 1925.

H. H. VERNON

MOTOR CONTROL SYSTEM

Filed May 5, 1924  2 Sheets-Sheet 2

1,534,750

Inventor:
Harvey H. Vernon,
by
His Attorney.

Patented Apr. 21, 1925.

UNITED STATES PATENT OFFICE.

HARVEY H. VERNON, OF SCHENECTADY, NEW YORK, ASSIGNOR TO GENERAL ELECTRIC COMPANY, A CORPORATION OF NEW YORK.

MOTOR-CONTROL SYSTEM.

Application filed May 5, 1924. Serial No. 711,009.

*To all whom it may concern:*

Be it known that I, HARVEY H. VERNON, a citizen of the United States, residing at Schenectady, in the county of Schenectady, State of New York, have invented certain new and useful Improvements in Motor-Control Systems, of which the following is a specification.

My invention relates to systems of control for electric motors and more particularly to motor control systems in which the motor is operated between predetermined limits of operation, and the invention has for its object the provision of means for operating the motor beyond the predetermined limits of rotation at reduced speed and with reduced power.

Although of general application, the present invention is of particular utility when applied to systems of control for reversible electric motors employed in operating devices having a limited movement, such as for example, bascule bridges, gates for water locks, and the like. By means of my improved control system, the operating motor of such devices may be operated at full speed and power only within predetermined limits of rotation which are short of the final positions of the device and the movement of the device to the final positions is effected at all times with the motor at reduced speed and power in order to prevent wedging or jamming of the device in the final position.

Figure 1:
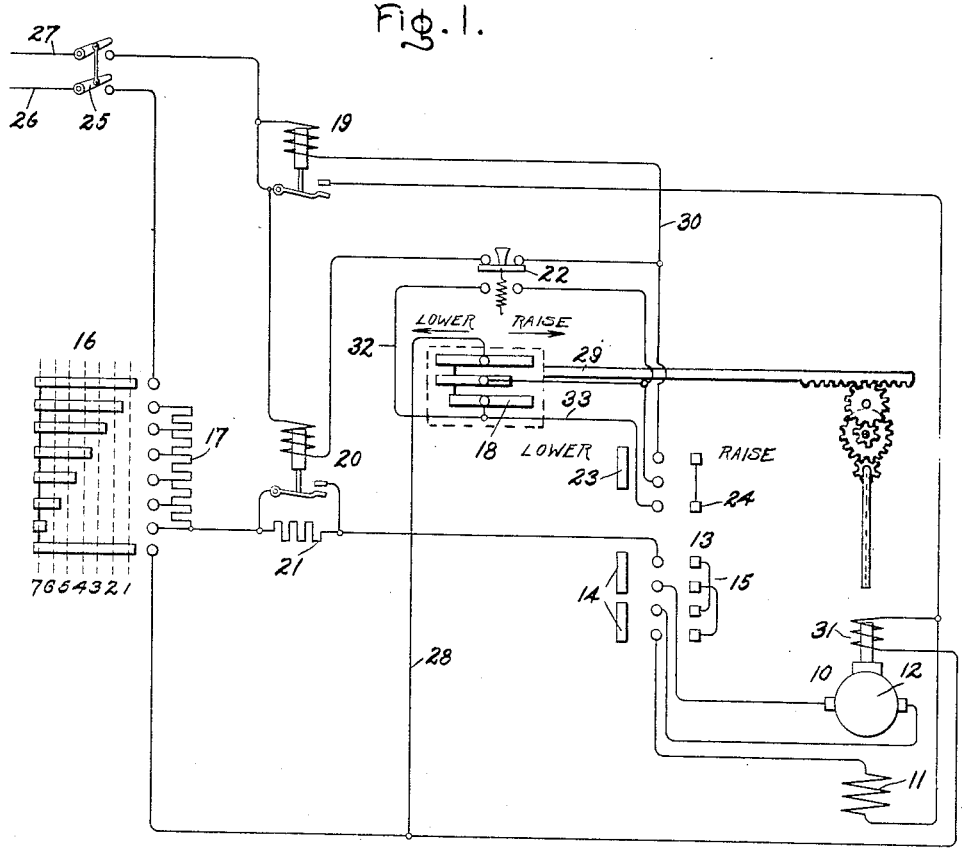
Figure 2:
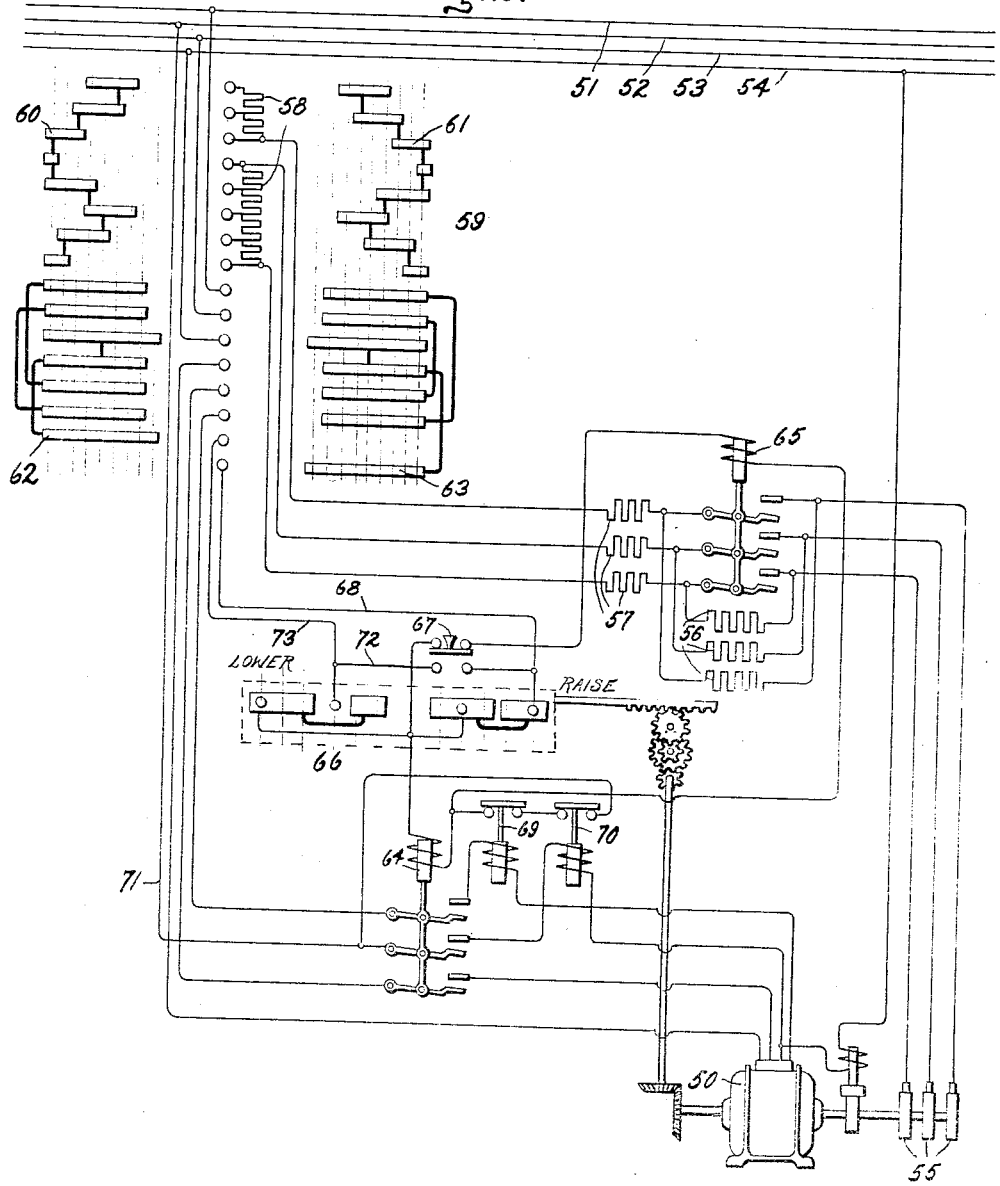

For a better understanding of my invention reference is had to the following description taken in connection with the accompanying drawings in which Fig. 1 diagrammatically illustrates a control system for a direct current electric motor embodying my invention, and Fig. 2 shows an alternating current motor control system likewise embodying the invention.

The novel features which I believe to be characteristic of my invention are pointed out with particularity in the appended claims.

Referring first to Fig. 1 of the drawings, the reversible electric motor 10 controlled according to my invention is shown as of the direct current series type having a series field winding 11 and an armature 12 which may be connected through suitable mechanical gearing (not shown) to operate a device (not shown) having a limited movement, which for present purposes may be assumed to be the leaf of a bascule bridge.

In the form shown in Fig. 1, the control system for motor 10 comprises a manually operated drum switch 13 which is provided with suitable sets of reversing contact segments 14 and 15 arranged to interconnect the field winding 11 with the armature 12 for operation of motor 10 in either direction to correspondingly raise and lower the bridge leaf; a manually operable speed controller 16 for varying the speed controlling resistance 17; a limit switch mechanism 18; and a pair of normally open electromagnetic switches 19 and 20, the latter of which is arranged to close a short circuit around the current limiting resistance 21 connected in the motor circuit.

The limit switch mechanism 18 is mechanically connected to the motor 10, preferably through speed reducing gearing as indicated in the drawing, and is arranged to be moved to the left to disengage the middle contact segment from the cooperating stationary contact when the motor 10 has rotated sufficiently in the lowering direction to operate the leaf of the bascule bridge within a short distance of its final lowered position. Likewise the lower contact of limit switch 18 is disengaged from its cooperating stationary contact when the motor 10 has raised the bridge within a short distance of its final raised position. The resistance 21 is of sufficient ohmic value to limit the current of motor 10 to a desired value at which the motor torque and power are greatly reduced.

It will be observed that a two position manual control switch 22 is biased to the upper position as shown, in which it establishes an energizing circuit for the operating winding of electromagnetic switch 20 in parallel with the winding of switch 19. In the lower position, switch 22 is arranged to cooperate with limit switch mechanism 18 and one of the control contacts 23 and 24 of the master controller 13 to effect operation of the motor 10 with the current limiting resistance 21 in circuit therewith beyond the limit of operation determined by the limit switch mechanism 18, as will more fully appear in the following description of the operation of my improved control system.

With the disconnecting switch 25 closed and the supply lines 26 and 27 energized from a suitable source of supply, the motor 10 may be started and accelerated to full running speed in either direction by first operating the master switch 13 so as to engage one of the reversing contacts 14 or 15 with the stationary contacts cooperating therewith and then operating the speed controller 16 successively through the operating positions 1 to 7 indicated on the drawing. Assuming that the switch 13 is moved to the right to bring the reversing contact 14 and the control contact 23 into engagement with the stationary contacts cooperating therewith in order to operate the motor 10 in the direction required to lower the bascule bridge, and that the speed controller 16 is moved into the first position, an energizing circuit for the operating winding of the electromagnetic switch 19 is thereupon established from the supply line 26 through the upper and lower contact segments of speed controller 16, the conductor 28, the upper and middle contact segments of limit switch mechanism 18, conductor 29, control segment 23 of switch 13, conductor 30, and through the operating winding of electromagnetic switch 19 to the other supply line 27. Since the operating winding of electromagnetic switch 20 is connected in a parallel circuit including the manual control switch 22 with the operating winding of the electromagnetic switch 19, switch 20 also is energized and operates to establish a short circuit around the current limiting resistance 21 substantially simultaneously with the operation of the electromagnetic switch 19. Upon closure of the switch 19, the electromagnetic brake 31 is energized from the supply lines 26 and 27 through a circuit including the upper and lower contact segments of the speed controller 16 and the contact of switch 19 and immediately operates from the braking position to which it is biased as shown to permit rotation of the motor 10.

Motor 10, however, remains unenergized until the speed controller 16 is moved into the second position, thereby completing an energizing circuit for the motor extending from the supply line 26 through the upper two contact segments of speed controller 16, the speed regulating resistance 17, the short circuited current limiting resistance 21 and alternately through the reversing contact segments 14 of switch 13, the armature 12 and the field 11 of motor 10 and thence through the switch 19 to the other supply line 27. The motor 10 at once starts in the lowering direction and may be accelerated to full running speed by operation of the speed controller 16 through the successive positions 3, 4, 5, 6 and 7 indicated in the drawing.

While the motor 10 is lowering the bridge leaf at full speed the limit switch mechanism 18 gradually is moved to the left and when the bridge leaf is within a short distance of its final lowered position the middle contact segment of the limit switch mechanism is disengaged from its cooperative stationary contact and interrupts the circuit through the conductor 29. Thereupon the operating winding of the electromagnetic switch 19 is deenergized and the switch opens according to its bias and disconnects the motor 10 as well as the electromagnetic brake 31 from the supply line 27. Brake 31 thereupon returns to the braking position and quickly stops rotation of motor 10. At the same time the electromagnetic switch 20 is deenergized and opens the short circuit around the current regulating resistance 21.

In order to continue the rotation of the motor 10 in the lowering direction beyond the limit determined by the limit switch mechanism 18, it is necessary to operate the manual control switch 22 from the biased position in which it is shown to its second position. This simultaneously interrupts the energizing circuit of the electromagnetic switch 20 and closes an energizing circuit for the electromagnetic switch 19 in shunt to the middle contact segment of limit switch mechanism 18 which may be traced as follows: from the supply line 26 through the speed controller 16, conductor 28, the upper and lower contact segments of limit switch 18, the conductor 32, control switch 22 in its lower position, and then through the control segment 23 of switch 13, the conductor 30, and the operating winding of electromagnetic switch 19 to the other supply conductor 27. Upon the resulting closure of switch 19, the motor 10 is reconnected to the supply lines 26 and 27 with the current limiting resistance 21 in circuit therewith for operating in the lowering direction at reduced speed and with reduced torque and power even though the speed controller 16 is allowed to remain in the full speed position. Thus the bascule bridge is operated to its final lowered position without danger of wedging or jamming. It will be evident that the speed controller 16 may be returned to the second position to still further reduce the motor speed and power during the final movement of the bridge by inserting the resistance 17 in the motor circuit. Upon the final seating of the bridge in the lowered position, manual control switch 22 is released to deenergize the switch 19 and effect the disconnection of motor 10 from the supply lines and the speed controller 16 is returned to the "off" position shown.

In order to operate motor 10 in the opposite direction so as to raise the bascule bridge, the master controller 13 is moved to the left thereby bringing the reversing contact segments 15 and the control segments 24 into engagement with the cooperating stationary contact and the speed controller 16 is again operated successively through the positions 1 to 7 to close the electromagnetic switches 19 and 20 and accelerate the motor 10 to full running speed. In this case when the speed controller is in the first position the electromagnetic switch 19 is energized through a circuit extending from supply line 26 through the upper and lower contacts of the controller 16, the conductor 28, the upper and lower contact segments of limit switch mechanism 18, the conductor 33, control segments 24, the conductor 30, and the operating winding of electromagnetic switch 19 to the other supply line 27. It will be obvious that at the same time the electromagnetic switch 20 is energized through the manual control switch 22 in parallel with the operating winding of electromagnetic switch 19.

After the motor 10 has operated the bascule bridge within a short distance of its final raised position, the lower contact segment of limit switch 18 is disengaged from its cooperating stationary contact and interrupts the energizing circuit through the conductor 33 of both the electromagnetic switches 19 and 20 which respectively operate to disconnect the motor and open the short circuit around the resistance 21. The movement of the bascule bridge to the final raised position is effected by operating the manual control switch 22 to its second position thereby energizing switch 19 through the upper and middle contact segments of limit switch mechanism 18, conductor 29, control switch 22 in its lower position, the conductors 32 and 33, contact segments 24 of switch 13, the conductor 30, and thence through the operating winding of switch 19. Thus it will be seen that the final movement of the bascule bridge to the raised position is accomplished with the current limiting resistance 21 in circuit with the motor 10 to reduce the motor speed and the torque in a similar manner to that described in lowering the bridge to its final position.

Referring now to Fig. 2, which illustrates my invention applied to alternating current motor control, it will be seen that the alternating current motor 50 is of the induction type adapted to be energized from the two phase supply lines 51, 52, 53 and 54 and that the rotor windings of motor 50 are connected through the slip rings 55 in circuit with the current limiting resistances 56 and 57 and the variable speed controlling resistances 58. The motor 50 may be mechanically connected through suitable gearing to operate a device having a limited movement such as a bascule bridge in the same manner as was described in connection with Fig. 1.

To control motor 50, drum switch 59 is provided with oppositely disposed sets of speed controlling contact segments 60 and 61 for varying the speed controlling resistances 58 and with corresponding reversing contact segments 62 and 63 for interconnecting the stator windings of motor 50 with the two phase supply lines 51, 52, 53 and 54 for operation in either direction. A three blade electromagnetic switch 64 is provided for completing the energizing circuit of motor 50 and a similar three blade electromagnetic switch 65 is arranged to short circuit the current limiting resistance 56.

In order to limit the operation of motor 50 at full speed and power within predetermined limits, the limit switch mechanism 66 is mechanically connected, as by means of the speed reducing gearing shown in the drawing, to be actuated by the motor 50 and is arranged to cooperate with the drum switch 59 in controlling the energization and deenergization of the electromagnetic switches 64 and 65. A two position manual control switch 67 is normally connected in the energizing circuit of the electromagnetic switch 65 and is operable to establish an energizing circuit for the electromagnetic switch 64 in shunt with the limit switch 66 to operate the motor 50 at reduced power beyond the limits determined by the limit switch mechanism, as will be better understood from the following description of the operation of my improved control system.

With the parts in their respective positions shown in Fig. 2, the motor 50 may be operated to raise the leaf of the bascule bridge by operating the drum switch 59 to the left through the successive positions indicated in the drawing. In the first position an energizing circuit for each of the electromagnetic switches 64 and 65 is established from the supply line 54 through the longer two of the reversing contact segments 63, the conductor 68, the right hand contact segments of limit switch mechanism 66, through the operating winding of the electromagnetic switch 64 in parallel with a circuit including the manual control switch 67 and the operating winding of electromagnetic switch 65, and thence through the contacts of the overload relays 69 and 70 and the conductor 71 to the supply line 52. The electromagnetic switch 65 at once operates to short circuit the current limiting resistances 56 and the electromagnetic switch 64 likewise operates to the closed position and establishes an energizing circuit for the electromagnetic brake 71 extending from the supply line 52 through the middle blade of switch 64, the winding of overload relay 70, and the operating winding of the brake, to the supply line 54. Brake 71 thereupon operates from the braking position to which it is biased as shown to the release position.

When the master controller 59 is operated to the second position in which all of the reversing contact segments 63 engage with the cooperating stationary contacts, the motor 50 is connected to the supply lines 51, 52, 53 and 54 and starts to operate in the direction required to raise the bascule bridge with the resistances 57 and a portion of resistances 58 in circuit with the rotor windings. Upon the operation of the drum switch 59 through the successive controlling positions indicated the speed controlling resistances 58 in the rotor circuit of motor 50 are progressively decreased to accelerate the motor to full running speed in a manner which will be obvious to those skilled in the art.

As the motor 50 is thus operated to raise the bascule bridge, the limit switch mechanism 66 is gradually operated to the left. When the bridge leaf is operated within a predetermined distance of its final raised position the limit switch mechanism 66 opens the control circuit through the conductor 68 and thereby deenergizes both of the electromagnetic switches 64 and 65. Electromagnetic switch 64 at once returns to the open position shown to interrupt the energizing circuits of motor 50 and electromagnetic brake 71 in order to stop further movement of the bascule bridge, and at the same time the electromagnetic switch 65 opens the short circuit around the current limiting resistances 56.

Operation of the bascule bridge to the final position is accomplished by moving the manual control switch 67 from the position shown to its second position. This not only completes an energizing circuit for the electromagnetic switch 64 extending from the supply line 54 through the longer two of the reversing contact segment 63 of drum switch 59, the conductor 68, the control switch 67 in its lower position, the conductor 72, the left hand contact segments of limit switch mechanism 66 which have been brought into engagement, the operating winding of electromagnetic switch 64 and then through the contacts of the overload relays 69 and 70 to the other supply lines 53, but also opens the energizing circuit of the electromagnetic switch 65 to prevent short circuiting of the current limiting resistances 56. Upon raising the bascule bridge to its final position with the current limiting resistances 56 in circuit with motor 50 to reduce the speed and power thereof, the manual control switch 67 is released to deenergize the electromagnetic switch 64 which again opens the energizing circuit of both motor 50 and electromagnetic brake 71 and the master controller 59 is returned to the "off" position.

In order to operate the motor 50 in the direction required to lower the bascule bridge, master controller 59 is operated to the right to engage the contact segments 60 and 62 successively with the cooperating stationary contacts of the master controller 59 in a manner similar to that previously described. In this case the electromagnetic switches 64 and 65 are energized from supply line 54 through the longer two segments of the reversing segments 62, the conductor 73, the left hand contacts of limit switch mechanism 66 and the respective operating windings of switches 64 and 65 in parallel circuit and thence through the contacts of the overload relays 69 and 70 and the conductor 71 to the other supply line 53. The electromagnetic switch 65 thereupon operates to short circuit current limiting resistances 56 and the electromagnetic switch 64 again closes the energizing circuit of the electromagnetic brake 71. The speed controlling resistances 58 are progressively decreased by the successive operation of the drum switch 59 through the control positions indicated to bring the motor to full running speed.

As the bascule bridge approaches the final lower position the limit switch mechanism 66 again interrupts the energizing circuit of the electromagnetic switches 64 and 65 by opening the circuit through the conductor 73. The electromagnetic switch 64 opens and the motor 50 and the electromagnetic brakes 71 are deenergized to stop further movement of the bridge and at the same time the electromagnetic switch opens the short circuit around the current limiting resistances 56.

The final operation of the bascule bridge into its lower position is effected by again moving the manual control switch 67 from the position shown to its second position in exactly the same manner as previously described. The energizing circuit of electromagnetic switch 65 is again opened and the electromagnetic switch 64 is energized to connect the motor 50 with the current limiting resistances 56 in circuit therewith to the supply lines 51, 52, 53 and 54.

From the preceding description of the operation of my invention it will be seen that while the motor is operating between the predetermined limits of rotation determined by the limit switch mechanism 66, the current limiting resistances 56 are short circuited to permit operation of the motor at full speed and with full power. However, upon operation of the manual control switch 67 to continue the operation of the motor 50 and move the bascule bridge into the final raised or lowered positions, the current limiting resistances 56 are connected in circuit with the rotor or motor 50 and thus limit both the speed and the power of the motor during this period of operation.

In accordance with the provisions of the patent statute I have explained the principles of operation of my invention together with two embodiments thereof but I would have it understood that the apparatus shown is only illustrative and that the invention may be carried out by other means.

What I claim as new and desire to secure by Letters Patent of the United States, is,—

1. In a motor control system, the combination with an electric motor and a current limiting resistance therefor, of switch mechanism for short circuiting the said resistance and connecting the motor to a source of supply, limit switch mechanism for stopping the motor after a predetermined rotation thereof, and manually actuated means for connecting the motor with said resistance in circuit therewith to said source to continue rotation thereof beyond the limit determined by said limit switch mechanism.

2. In a motor control system, the combination with a reversible electric motor and a current limiting resistance therefor, of electromagnetic switch mechanism for short circuiting the said resistance and connecting the motor to a source of supply for operation in either direction, limit switch mechanism for stopping the motor after a predetermined rotation thereof in each direction, and manual control means for controlling said switch mechanism to connect said motor with said resistance in circuit therewith to said source to continue rotation thereof in each direction beyond the limits determined by said limit switch mechanism.

3. In a motor control system, the combination with a reversible electric motor and a current limiting resistance therefor, of an electromagnetic switch for controlling the motor circuit, a second electromagnetic switch for short circuiting the said resistance, means for controlling the operation of both of said switches to short circuit said resistance and connect the motor to a source of supply for operation between predetermined limits of rotation, comprising a drum switch and limit switch mechanism actuated responsively to a predetermined rotation of the motor in each direction, and manually operable means cooperating with said first means for controlling the operation of said electromagnetic switches to connect the motor with said resistance in circuit therewith to said source to continue operation of the motor beyond the limits determined by said limit switch mechanism.

4. In a motor control system, the combination with a reversible electric motor and a current limiting resistance therefor, of a drum switch for reversing the connections of said motor to a source of supply, an electromagnetically actuated switch controlled by said drum switch for closing and opening the supply connections of said motor, a second electromagnetically actuated switch controlled by said drum switch for establishing a short circuit around the said resistance, limit switch mechanism actuated responsively to a predetermined rotation of the motor in either direction for disabling the control of each of said electromagnetically actuated switches by said drum switch, and manually operated control switch mechanism for controlling the first of said electromagnetic switches to continue operation of said motor with said resistance in circuit therewith beyond the limits determined by said limit switch mechanism.

5. In a motor control system, the combination with an electric motor and a current limiting resistance therefor, of a normally open electromagnetic switch operable to connect the motor with said resistance in circuit therewith to a source of supply, a second normally open electromagnetic switch operable to short circuit the said resistance, a master switch for establishing an energizing circuit for each of said switches, limit switch contact mechanism connected in the said energizing circuit of each of said electromagnetic switches and actuated responsively to a predetermined rotation of the motor for interrupting the same, and a two position manual switch normally connected in the energizing circuit of said second electromagnetic switch and operable to open the energizing circuit of said second switch and establish an energizing circuit for said first electromagnetic switch in shunt with said limit switch contact mechanism.

6. In a motor control system, the combination with a reversible electric motor and a current limiting resistance therefor, of a manual drum switch for reversing the connection of said motor to a source of supply and for controlling the speed thereof, an electromagnetically operated switch biased to the open position and operable to the closed position to complete the supply circuit of the motor for operation in the direction determined by said drum switch, a second electromagnetically operated switch biased to the open position and operable to establish a short circuit around the said resistance, an energizing circuit for each of said switches controlled by said drum switch, limit switch mechanism connected in said circuit and actuated responsively to a predetermined rotation of the motor in each direction for opening the same, and a manual control switch for interrupting the control circuit of said second electromagnetic switch and completing the control circuit of said first electromagnetic switch.

7. The combination with an alternating current motor having a resistance connected in the secondary circuit for limiting the primary current thereof, of an electromagnetic switch for controlling the primary circuit of the motor, a second electromagnetically actuated switch biased to the open position and operable to the closed position to establish a short circuit around the said resistance, means for controlling the energizing circuits of said switches comprising a drum switch operable at will to simultaneously energize and deenergize the said switches, limit switch mechanism actuated responsively to a predetermined rotation of the motor for interrupting the control of said drum switch, and a manual control switch for establishing an energizing circuit for said first electromagnetic switch to operate said motor with said resistance in circuit therewith beyond the limit determined by said limit switch mechanism.

In witness whereof, I have hereunto set my hand this 3rd day of May, 1924.

HARVEY H. VERNON.